Stuart & Stewart,
Hay Press.
No. 23,201. Patented Mar. 8, 1859.
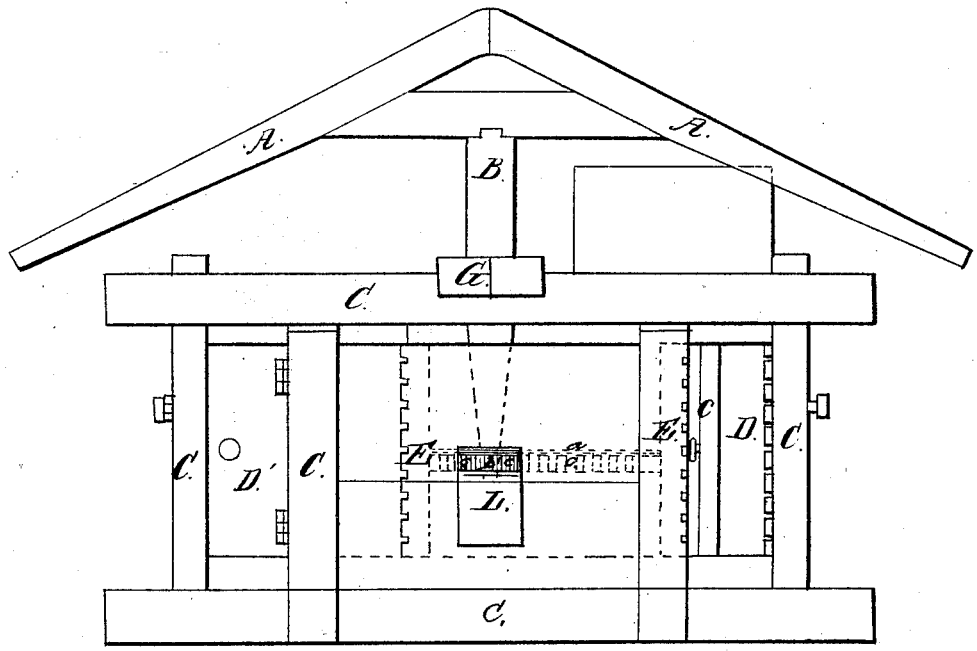
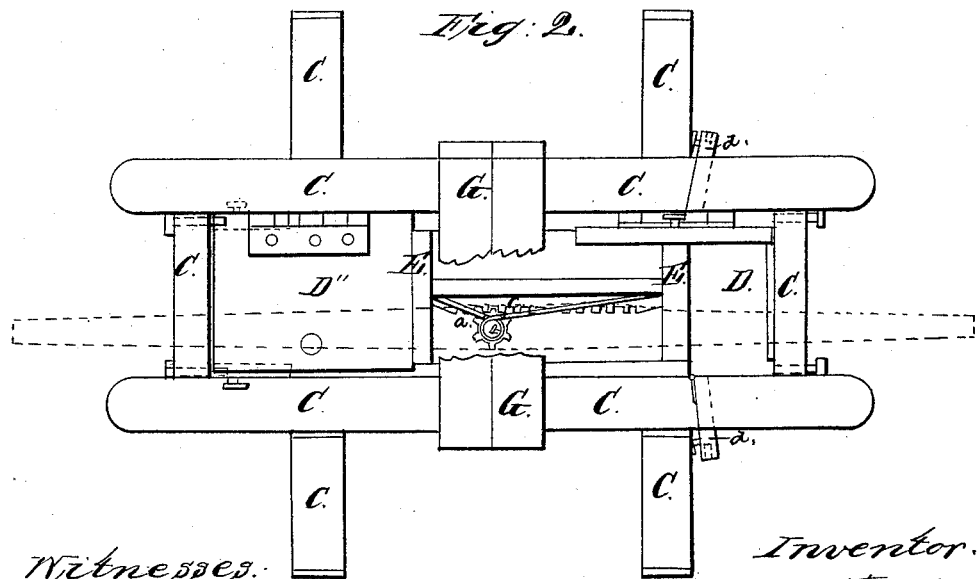
Witnesses
Jo. Arbuckle
Tyre Harris
Inventor.
M. J. Stuart
C. E. Stewart

UNITED STATES PATENT OFFICE.

URIAH T. STUART AND CALVIN E. STEWART, OF FAYETTE COUNTY, TENN.

IMPROVEMENT IN COTTON-PRESSES.

Specification forming part of Letters Patent No. 23,201, dated March 8, 1859.

*To all whom it may concern:*

Be it known that we, URIAH T. STUART and CALVIN E. STEWART, of the county of Fayette, in the State of Tennessee, have invented a new and useful Improvement in Cotton and other Presses; and we do hereby declare that the following is a full and exact description thereof, reference being had to the accompanying drawings, and to the letters of reference marked thereon.

Figure 1 is a side elevation. Fig. 2 is a plan view.

The nature of our invention consists in the manner, hereinafter described, of combining in the operation of our press the rack and pinion with the rope and windlass.

To enable others skilled in the art to make and use our invention, we will describe its construction and operation.

In both figures similar characters denote like parts.

A represents the operating-levers; B, the vertical shaft, to which is attached, at the lower end, pinion b, which operates rack c, and also around which is wound rope a, which has its ends attached to the followers E; D, the boxes for receiving the cotton, left open; D', the cotton-box, with the door closed; D'', the covers to cotton-boxes; F, the cross-piece, to which is attached the journal-box, into which is let the journal on the lower end of shaft B. G is the cross-beam fitting around shaft B as a collar, and holding it in position.

In the mode of operating, it will be perceived that this invention contains a double-acting power, each power supporting the other, combining the power produced by the winding and unwinding of the rope on the windlass with the power of the rack-bar and pinion. The rope is passed twice around the shaft, and an end is attached to each plunger E, and while it winds up one plunger it unwinds the other. It employs two sets of hands, and while one set of hands are tying a bale the other set are filling the other box, and while one plunger is being withdrawn to let the bale out of the box the other plunger is pressing a bale in the other box. The rope and windlass and rack-bar and pinion are attached to the shaft and the shaft is turned by lever-power. The pinion works in a rack which is fastened to the driver, and the driver moves the plungers back and forth.

The press is a horizontal frame-work. The boxes in which the cotton is packed stand on the edge, and the bale, when finished, stands on end.

The press is of simple construction, easily built, and requires but little timber, the timbers all being small and light.

We do not claim the invention of the rack-bar and pinion used in this invention; but We do claim—

The combination of the rack and pinion with the rope and windlass for operating a press with two pressing-boxes, constructed substantially as described.

U. T. STUART.
C. E. STEWART.

Test:
JOS. ARBUCKLE,
TYRE HARRIS.